US011908599B2

(12) United States Patent
Kawajiri et al.

(10) Patent No.: US 11,908,599 B2
(45) Date of Patent: Feb. 20, 2024

(54) VARISTOR AND METHOD FOR MANUFACTURING THE SAME

(71) Applicant: Panasonic Intellectual Property Management Co., Ltd., Osaka (JP)

(72) Inventors: Keiji Kawajiri, Hokkaido (JP); Naoki Mutou, Hokkaido (JP); Hironori Motomitsu, Osaka (JP); Michiya Watanabe, Hokkaido (JP); Yuji Yamagishi, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/892,711

(22) Filed: Aug. 22, 2022

(65) Prior Publication Data

US 2023/0081158 A1 Mar. 16, 2023

(30) Foreign Application Priority Data

Aug. 31, 2021 (JP) ................................ 2021-141821

(51) Int. Cl.

*H01C 7/102* (2006.01)
*H01C 7/112* (2006.01)
*H01C 17/065* (2006.01)
*H01C 1/142* (2006.01)
*H01C 7/10* (2006.01)

(52) U.S. Cl.

CPC ............ *H01C 7/102* (2013.01); *H01C 1/142* (2013.01); *H01C 7/1006* (2013.01); *H01C 7/112* (2013.01); *H01C 17/06546* (2013.01)

(58) Field of Classification Search

CPC ...... H01C 7/102; H01C 7/1006; H01C 7/112; H01C 17/06546; H01C 1/142

See application file for complete search history.

(56) References Cited

U.S. PATENT DOCUMENTS 6,171,644 B1 * 1/2001 Jinno ...................... H01C 7/18 29/613
6,232,867 B1 * 5/2001 Yoshida ................ H01C 7/102 338/21
2003/0043012 A1 * 3/2003 Shiraishi ............... H01C 7/102 338/21

FOREIGN PATENT DOCUMENTS

JP S6031244 Y2 * 9/1985
JP 2001-035706 A 2/2001

(Continued)

OTHER PUBLICATIONS

JPS6031244, machine translation. (Year: 1985).*
JP2017059820, machine translation. (Year: 2017).*
WO2022113822, machine translation. (Year: 2022).*

*Primary Examiner* — Kyung S Lee
(74) *Attorney, Agent, or Firm* — Rimon P.C.

(57) ABSTRACT

A varistor includes a sintered body, an internal electrode, an insulating layer, and an external electrode. The internal electrode is disposed in an interior of the sintered body. The insulating layer covers at least part of the sintered body and includes $Zn_2SiO_4$. The external electrode is electrically connected to the internal electrode, covers part of the sintered body and part of the insulating layer, and is in contact with the part of the insulating layer. The insulating layer has a region being in contact with the external electrode, the region having a greater average thickness than a region of the insulating layer which is out of contact with the external electrode.

17 Claims, 1 Drawing Sheet

(56) References Cited

FOREIGN PATENT DOCUMENTS

| | | | | | |
|---|---|---|---|---|---|
| JP | 2002-043105 | A | | 2/2002 | |
| JP | 2008-270328 | A | | 11/2008 | |
| JP | 2017059820 | A | * | 3/2017 | ............ H01G 4/012 |
| WO | WO-2022113822 | A1 | * | 6/2022 | |

* cited by examiner

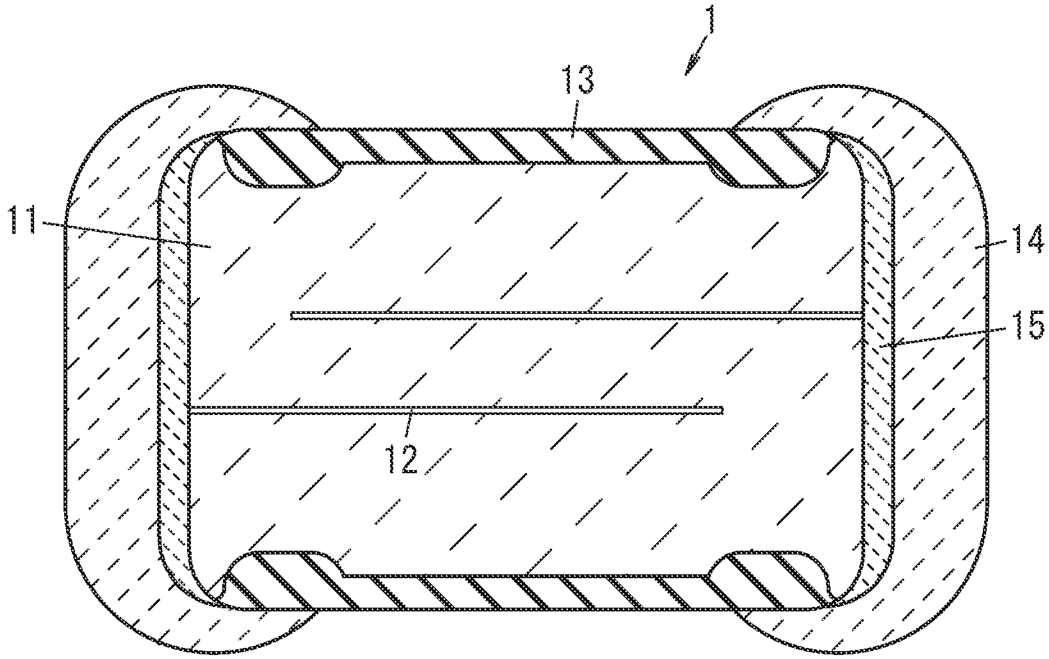
1
13
11
14
15
12

VARISTOR AND METHOD FOR MANUFACTURING THE SAME

CROSS-REFERENCE TO RELATED APPLICATION

The present application is based upon and claims the benefit of priority to Japanese Patent Application No. 2021-141821, filed on Aug. 31, 2021, the entire contents of which are incorporated herein by reference.

TECHNICAL FIELD

The present disclosure relates to varistors and methods for manufacturing the varistors and specifically relates to a varistor including a sintered body, internal electrodes, an insulating layer, and external electrodes and a method for manufacturing the varistor.

BACKGROUND ART

Varistors are used, for example, to protect various kinds of electronic equipment, electronic devices, and the like from an abnormal voltage caused by a lightning surge, static electricity, or the like and to prevent the electronic equipment, the electronic devices, and the like from malfunctioning due to noise generated in circuits.

Such varistors are required to have durability so that their performance does not degrade even when they are used for a long time period. In particular, under a high humidity condition, moisture entering the interior of the varistor generates conductive carriers, which leads to an increased leakage current with time and an increased electric power consumption by the electronic equipment, and in addition, the moisture tends to, for example, degrade the voltage non-linearity of the varistor, and therefore, the moisture resistance of the varistor is required to be improved.

JP 2001-035706 A discloses a varistor including: a varistor element including ZnO as a main component; a pair of external electrodes formed on part of a surface of the varistor element; and a compound layer on the entirety of the surface except for the part on which the external electrodes are formed, the compound layer being made of a Zn—Si—O-based or Bi—Si—O-based compound which is a high resistive element.

JP 2008-270328 A discloses a varistor including: a sintered body obtained by sintering a stack including alternately stacked varistor layers and internal electrodes; and a pair of external electrodes at at least both end surfaces of the sintered body with the internal electrodes alternately connected thereto, wherein the varistor includes a glass layer provided near a second external electrode in the sintered body.

Varistors are, however, recently used in a harsher environment by being applied to, for example, in-vehicle devices, and therefore, the demand for the moisture resistance is further increasing, but the conventional varistor cannot satisfy this demand.

SUMMARY

It is an object of the present disclosure to provide a varistor excellent in moisture resistance and a method for manufacturing the varistor.

A varistor according to an aspect of the present disclosure includes a sintered body, an internal electrode, an insulating layer, and an external electrode. The internal electrode is disposed in an interior of the sintered body. The insulating layer covers at least part of the sintered body and includes $Zn_2SiO_4$. The external electrode is electrically connected to the internal electrode, covers part of the sintered body and part of the insulating layer, and is in contact with the part of the insulating layer. The insulating layer has a region being in contact with the external electrode and having a greater average thickness than a region of the insulating layer which is out of contact with the external electrode.

A method for manufacturing a varistor according to an aspect of the present disclosure includes preparing a sintered body including ZnO as a main component and including an internal electrode disposed in an interior of the sintered body. The method further includes forming a precursor layer including $SiO_2$ or silicate such that the precursor layer covers at least part of the sintered body. The method further includes applying an external electrode paste including $Bi_2O_3$ such that the external electrode paste covers part of the sintered body and is in contact with part of the precursor layer. The method further includes performing heat treatment to form an insulating layer including $Zn_2SiO_4$ from the precursor layer and form an external electrode from the external electrode paste.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 1 is a schematic sectional view of a varistor according to the present embodiment.

DETAILED DESCRIPTION

1. Overview

A varistor 1 according to the present embodiment includes a sintered body 11, internal electrodes 12, an insulating layer 13, and external electrodes 14. Moreover, as shown in FIG. 1, an average thickness of regions of the insulating layer 13 which are in contact with the external electrodes 14 (hereinafter also referred to as a contact region thickness) is characterized by being greater than an average thickness of regions of the insulating layer 13 which are out of contact with the external electrodes 14 (hereinafter also referred to as a non-contact region thickness).

The inventors intensively studied components of a varistor and found that in variously changing the composition of components included in external electrodes of the varistor, the thickness of regions of the insulating layer which are in contact with the external electrodes may be varied, and increasing the thickness of the regions improves the moisture resistance of the varistor, and the inventors thus completed the present disclosure.

As described above, the varistor 1 has excellent moisture resistance. Why the contact region thickness of the insulating layer 13 being greater than the non-contact region thickness improves the moisture resistance is not necessarily clear but can be inferred, for example, as follows. That is, moisture under high humidity may pass through a continuous micropore provided in the insulating layer 13, also pass through an end surface of the sintered body 11, and reach the sintered body 11 between the internal electrodes 12. In the conventional varistor, the contact region thickness and the non-contact region thickness of the insulating layer 13 are substantially equal to each other, whereas in the varistor 1 of the present embodiment, the contact region thickness is greater than the non-contact region thickness, and therefore, such a continuous micropore is reduced, which can reduce entry of moisture compared to the conventional varistor, so that moisture resistance can be improved.

A method for manufacturing the varistor 1 according to the present disclosure includes a first step, a second step, a third step, and a fourth step. The first step includes preparing a sintered body 11 including ZnO as a main component and including internal electrodes disposed in an interior of the sintered body 11. The second step includes forming a precursor layer including $SiO_2$ or silicate such that the precursor layer covers at least part of the sintered body 11. The third step includes applying an external electrode paste including $Bi_2O_3$ such that the external electrode paste covers part of the sintered body 11 and is in contact with part of the precursor layer. The fourth step includes performing heat treatment to form an insulating layer 13 including $Zn_2SiO_4$ from the precursor layer and to form external electrodes 14 from the external electrode paste.

In manufacturing the varistor 1, the insulating layer 13 is formed by reaction between a ceramic component and the like in the sintered body 11 and a glass component and the like. According to the method in the present embodiment, reaction between ZnO included in the sintered body 11 and $SiO_2$ or silicate included in the precursor layer forms the insulating layer 13 including $Zn_2SiO_4$, and $Bi_2O_3$ included in the external electrode paste presumably has the effect of accelerating this formation reaction. As a result, the contact region thickness of the insulating layer 13 can be made greater than the non-contact region thickness, and a varistor excellent in moisture resistance can thus be easily manufactured.

Thus, the present disclosure provides a varistor excellent in moisture resistance and a method for manufacturing the varistor.

2. Details

<Varistor>

The varistor 1 in FIG. 1 includes the sintered body 11, the internal electrodes 12, the insulating layer 13, and the external electrodes 14. Each of these components will be described below.

[Sintered Body]

The sintered body 11 is a part which develops the voltage non-linearity of the varistor 1, and the sintered body 11 normally includes a semiconductor ceramic component. The sintered body 11 is constituted by a stack including a plurality of layers.

The sintered body 11, for example, includes ZnO, $SrTiO_3$, SiC, or the like as a main component and $Bi_2O_3$, $Co_3O_4$, $MnO_2$, $Sb_2O_3$, $Pr_6O_{11}$, $CaCO_3$, $Cr_2O_3$, or the like as an accessory component. The sintered body 11 preferably includes ZnO. In this case, ZnO in the sintered body 11 can produce $Zn_2SiO_4$ by reaction with $SiO_2$ or the like and can easily form the insulating layer 13.

The sintered body 11 substantially includes no $Bi_2O_3$, or the concentration of $Bi_2O_3$ in the sintered body 11 is preferably lower than the concentration of $Bi_2O_3$ in the external electrodes 14. $Bi_2O_3$ presumably has a significant effect of accelerating the formation of the insulating layer 13 by the reaction between the semiconductor ceramic component included in the sintered body 11 and the glass component such as $SiO_2$, and therefore, setting the concentration of $Bi_2O_3$ in the sintered body 11 as explained above increases the contact region thickness of the insulating layer 13 to be greater than the non-contact region thickness, which consequently further improves the moisture resistance of the varistor 1. The "concentration" means the ratio of the mass of a component with respect to the total mass (% by mass).

[Internal Electrode]

The internal electrodes 12 are disposed in the interior of the sintered body 11. In FIG. 1, two internal electrodes 12 are provided, but the number of the internal electrodes 12 is not limited to this example. Three or more internal electrodes 12 may be disposed, and a desired electrode structure may be formed.

The internal electrodes 12 may be formed of an internal electrode paste including Ag, Pd, Pt, PdAg, PtAg, or the like.

[Insulating Layer]

The insulating layer 13 covers at least part of the sintered body 11. In the varistor 1 shown in FIG. 1, the insulating layer 13 covers the entire surface of the sintered body 11 except for the end surfaces of the sintered body 11.

The insulating layer 13 includes $Zn_2SiO_4$. $Zn_2SiO_4$ included in the insulating layer 13 makes the linear expansivity of the insulating layer 13 close to that of the sintered body 11, thereby improving the crack resistance of the varistor 1, which improves the moisture resistance. The insulating layer 13 may include $Bi_4(SiO_2)_4$, $SiO_2$, or the like in addition to $Zn_2SiO_4$.

The insulating layer 13 including $Zn_2SiO_4$ can be formed by applying a coating liquid including the glass component such as $SiO_2$ or silicate such that the coating liquid covers at least part of the sintered body 11, thereby forming the precursor layer, which is then subjected to heat treatment to cause reaction between the semiconductor ceramic component such as ZnO included in the sintered body 11 and the glass component such as $SiO_2$ included in the precursor layer.

In the insulating layer 13, the average thickness of the regions in contact with the external electrodes 14 is greater than the average thickness of the regions which are out of contact with the external electrodes 14. The "average thickness" means an arithmetic mean value of thicknesses of the insulating layer 13 measured at 10 arbitrary points in each of a group of contact regions and a group of non-contact regions of the insulating layer 13. However, if the average thickness of the regions which are out of contact with the external electrodes 14 is zero, the magnitude relationship between the contact region thickness and the non-contact region thickness cannot be specified.

The non-contact region thickness is, for example, greater than or equal to 0.01 μm and less than or equal to 10 μm, preferably greater than or equal to 0.1 μm and less than or equal to 7 μm, and more preferably greater than or equal to 1 μm and less than or equal to 5 μm. The contact region thickness is, for example, greater than or equal to 0.1 μm and less than or equal to 50 μm, preferably greater than or equal to 1 μm and less than or equal to 40 μm, and more preferably greater than or equal to 5 μm and less than or equal to 30 μm. A value obtained by subtracting the non-contact region thickness from the contact region thickness is, for example, greater than or equal to 1 μm and less than or equal to 20 μm, preferably greater than or equal to 3 μm and less than or equal to 15 μm, and more preferably greater than or equal to 5 μm and less than or equal to 10 μm. The ratio of the contact region thickness to the non-contact region thickness (contact region thickness/non-contact region thickness) is, for example, greater than or equal to 1.1 and less than or equal to 10, preferably greater than or equal to 2 and less than or equal to 8, and more preferably greater than or equal to 3 and less than or equal to 5. Setting the contact region thickness as explained above can further improve the moisture resistance of the varistor 1.

[External Electrode]

The external electrodes 14 are electrically connected to the internal electrodes 12, cover part of the sintered body 11 and part of the insulating layer 13, and are in contact with part of the insulating layer 13. In the varistor 1 shown in FIG. 1, the external electrodes 14 cover ends of the sintered body 11 and are in contact with the insulating layer 13 in contact regions.

The external electrodes 14 include, for example, metal such as Ag; and/or a glass component such as $Bi_2O_3$, $SiO_2$, and $B_2O_5$. The external electrodes 14 preferably include $Bi_2O_3$. $Bi_2O_3$ presumably has a significant effect of accelerating the formation of the insulating layer 13 by reaction between the semiconductor ceramic component included in the sintered body 11 and the glass component. Thus, when the external electrodes 14 include $Bi_2O_3$, the formation reaction of the insulating layer 13 is further accelerated in the regions of the insulating layer 13 which are in contact with the external electrodes 14, and the contact region thickness is further increased, thereby further improving the moisture resistance of the varistor 1.

As shown in FIG. 1, the varistor 1 may include primary external electrodes 15 as external electrodes in addition to the external electrodes 14 (secondary external electrodes). The primary external electrodes 15 are disposed at the sides of the sintered body 11 and are in contact with part (first regions) of the insulating layer 13. The secondary external electrodes 14 cover the primary external electrodes 15 and are in contact with second regions of the insulating layer 13, the second regions being different from the first regions.

As described above, when the varistor 1 includes the primary external electrodes 15 and the secondary external electrodes 14 as the external electrodes, an average thickness of the second regions (regions in contact with the secondary external electrodes 14) of the insulating layer 13 preferably is greater than an average thickness of the first regions (regions in contact with the primary external electrodes 15) of the insulating layer 13. In this case, the regions of the insulating layer 13 which are in contact with the secondary external electrodes 14 have a further increased average thickness, thereby further improving the moisture resistance of the varistor 1.

Moreover, when the varistor 1 includes the primary external electrodes 15 and the secondary external electrodes 14 as the external electrodes, the primary external electrodes 15 include substantially no $Bi_2O_3$, or the concentration of $Bi_2O_3$ in the primary external electrodes 15 is preferably lower than the concentration of $Bi_2O_3$ in the secondary external electrodes 14. $Bi_2O_3$ presumably has a significant effect of accelerating the formation of the insulating layer 13 by the reaction between the semiconductor ceramic component included in the sintered body 11 and the glass component such as $SiO_2$, and therefore, setting the concentration of $Bi_2O_3$ in the primary external electrode 15 as explained above further increases the contact region thickness of the insulating layer 13 (average thickness of the regions in contact with the secondary external electrodes 14), which consequently further improves the moisture resistance of the varistor 1.

<Method for Manufacturing Varistor>

A method for manufacturing the varistor according to the present embodiment includes a first step, a second step, a third step, and a fourth step. The method for manufacturing the varistor according to the present embodiment is a manufacturing method in the case where in the varistor 1 of the present embodiment, the sintered body 11 includes ZnO as a main component, the insulating layer 13 is made of a precursor layer including $SiO_2$ or silicate, and the external electrodes 14 include $Bi_2O_3$. Each of the steps will be described below.

[First Step]

This step includes preparing the sintered body 11 including ZnO as a main component and including internal electrodes 12 disposed in the interior of the sintered body 11.

The sintered body 11 may be prepared by printing an internal electrode paste onto sheets prepared by a slurry including, for example, ZnO, stacking the sheets on each other, pressing and cutting the sheets, and then, performing debindering, firing, and beveling.

The slurry may be prepared, for example, by mixing ZnO which is a main raw material, $Bi_2O_3$, $Co_3O_4$, $MnO_2$, or the like which is an accessory raw material, and a binder.

As the internal electrode paste, for example, a Ag paste, a Pd paste, a Pt paste, a PdAg paste, or a PtAg paste may be used.

A temperature at which the debindering is performed is, for example, higher than or equal to 300° C. and lower than or equal to 500° C. A temperature at which the firing is performed may accordingly be adjusted depending on, for example, constituting compositions of the sintered body 11 to be obtained and is, for example, higher than or equal to 800° C. and lower than or equal to 1300° C. The beveling is normally performed after the firing but may be performed before the firing.

The sintered body 11 substantially includes no $Bi_2O_3$, or the concentration of $Bi_2O_3$ in the sintered body 11 is preferably lower than the concentration of $Bi_2O_3$ in the external electrode paste. $Bi_2O_3$ presumably has a significant effect of accelerating the formation of the insulating layer 13 including $Zn_2SiO_4$ by the reaction between the semiconductor ceramic component included in the sintered body 11 and $SiO_2$ or silicate included in the precursor layer, and therefore, setting the concentration of $Bi_2O_3$ in the sintered body 11 as explained above further increases the contact region thickness of the insulating layer 13 to be greater than the non-contact region thickness, which consequently further improves the moisture resistance of the varistor.

[Second Step]

This step includes forming the precursor layer including $SiO_2$ or silicate such that the precursor layer covers at least part of the sintered body 11 prepared in the first step.

The precursor layer may be formed by applying a coating liquid including silicate such as $SiO_2$ or sodium silicate to at least part of the sintered body 11 and performing dehydration and curing.

An application method is not particularly limited but may be any one of immersion, spraying, vacuum impregnation, printing, and the like or a combination thereof.

A temperature at which the dehydration and the curing are performed is, for example, higher than or equal to 220° C. and lower than or equal to 250° C., and a time for which the dehydration and the curing are performed is, for example, longer than or equal to 0.1 hours and shorter than or equal to 2 hours.

When the primary external electrodes 15 are also formed as the external electrodes in addition to the secondary external electrodes 14, a primary external electrode paste is preferably applied to only end surfaces before the second step or before the third step such that the primary external electrode paste covers part of the sintered body 11, comes into contact with part of the precursor layer, and does not spread to a main flat surface of the sintered body 11. The primary external electrode paste may be prepared by mixing, for example: metal such as Ag powder; and glass frit including $Bi_2O_3$, $SiO_2$, or $B_2O_5$; a vehicle; and a solvent together. The primary external electrode paste preferably includes no glass frit. After application of the primary external electrode paste, baking is preferably performed, for example, at a temperature higher than or equal to 600° C. and lower than or equal to 800° C. for longer than or equal to 10 minutes and shorter than or equal to 1 hour.

[Third Step]

This step includes applying the external electrode paste (secondary external electrode paste) including $Bi_2O_3$ such that the secondary external electrode paste covers part of the sintered body 11 and is in contact with part of the precursor layer formed in the second step. When the primary external electrodes 15 are formed, the secondary external electrode paste is applied to be in a prescribed shape covering the primary external electrodes 15.

The secondary external electrode paste may be prepared by mixing, for example: metal of Ag powder, glass frit including $Bi_2O_3$, $B_2O_5$, $Co_3O_4$, or $SiO_2$, a vehicle, and a solvent together. The secondary external electrode paste preferably includes no $SiO_2$ to suppress deposition onto a surface of the external electrode after the baking. The concentration of $Bi_2O_3$ in the secondary external electrode paste is preferably greater than or equal to 3% by mass and less than or equal to 30% by mass, more preferably greater than or equal to 5% by mass and less than or equal to 20% by mass. In this case, the thickness of the regions of the insulating layer 13 which are in contact with the secondary external electrodes 14 can be further increased, and consequently, the moisture resistance of the varistor can be further improved.

[Fourth Step]

This step includes performing heat treatment to form the insulating layer including $Zn_2SiO_4$ from the precursor layer and to from the external electrodes (secondary external electrodes 14) from the external electrode paste (secondary external electrode paste).

The condition for the heat treatment is, for example, that the temperature is higher than or equal to 800° C. and lower than or equal to 900° C. and the time is longer than or equal to 5 minutes and shorter than or equal to 1 hour.

By the heat treatment, the external electrodes (secondary external electrodes 14) are formed from the external electrode paste (secondary external electrode paste), and $SiO_2$ or silicate included in the precursor layer reacts with ZnO included in the sintered body 11, thereby forming the insulating layer 13 including $Zn_2SiO_4$. In this case, the effect of $Bi_2O_3$ included in the external electrode paste (secondary external electrode paste) makes the thickness of the regions of the insulating layer 13 which are in contact with the external electrodes 14 greater than the thickness of the regions of the insulating layer 13 which are out of contact with the external electrodes 14.

The method for manufacturing the varistor according to the present embodiment may further include a step of performing Ni plating, Sn plating, or the like by, for example, electrolytic plating after the first to fourth steps.

In the varistor manufactured as described above, the average thickness of the regions of the insulating layer 13 which are in contact with the external electrodes 14 is a greater than the average thickness of the regions of the insulating layer 13 which are out of contact with the external electrodes 14, and thus, this varistor is more excellent in moisture resistance.

EXAMPLE

The present disclosure will be specifically described below with reference to examples, but the present disclosure is not limited to the following examples.

<Manufacturing of Varistor>

A varistor of Example 1 was manufactured in the following procedure.

[Preparation of Sintered Body]

(Preparation of Slurry)

ZnO which is a main raw material, $Bi_2O_3$, $Co_3O_4$, $MnO_2$, or the like which is an accessory raw material, and a binder were mixed together, thereby preparing slurry.

(Preparation of Sheet)

The slurry thus prepared was adopted and were shaped into a prescribed thickness of greater than or equal to 20 μm and less than or equal to 50 μm, thereby preparing sheets.

(Preparation of Stack)

As an internal electrode paste, a Ag paste was adopted, the internal electrode paste was printed, onto the sheets thus prepared, to be in a prescribed shape, and the sheets were stacked to be in a prescribed electrode structure. The sheets were pressed to have a prescribed thickness and were then cut into a prescribed shape (to have a dimension of a length of 1.6 mm, a width of 0.8 mm, and a height of 0.8 mm in this example), thereby preparing a stack.

(Preparation of Sintered Body)

The stack thus prepared was debindered at a temperature of higher than or equal to 300° C. and lower than or equal to 500° C., was then calcined at a temperature of higher than or equal to 800° C. and lower than or equal to 1300° C., and was thereafter beveled, thereby preparing a sintered body.

[Formation of Primary External Electrode]

A primary external electrode paste was prepared by mixing: Ag powder; glass frit including $Bi_2O_3$, $SiO_2$, and $B_2O_5$; a vehicle; and a solvent together. The primary external electrode paste was applied to only end surfaces of the sintered body such that the primary external electrode paste does not spread to the main flat surface of the sintered body, and baking was then performed at 800° C. for 1 hour, thereby forming primary external electrodes.

[Preparation of Coating Body]

As a coating liquid for forming a precursor layer, a sodium silicate aqueous solution was adopted, was applied to the sintered body thus prepared, and was thereafter dehydrated and cured at a temperature of higher than or equal to 220° C. and lower than or equal to 250° C. for 1 hour, thereby forming the precursor layer and preparing the coating body.

[Formation of Secondary External Electrode]

A secondary external electrode paste was prepared by mixing: Ag powder; glass frit including $Bi_2O_3$, $B_2O_5$, and $Co_3O_4$; a vehicle; and a solvent together. The secondary external electrode paste was applied, to the coating body thus prepared, in a prescribed shape covering the primary external electrodes.

After the application of the secondary external electrode paste, baking was performed at a temperature of higher than or equal to 800° C. and lower than or equal to 900° C. for 10 minutes, thereby forming an insulating layer 13 including $Zn_2SiO_4$ from the precursor layer and forming secondary external electrodes 14 from the secondary external electrode paste.

[Preparation of Plating Body]

Ni plating having a prescribed thickness was formed by electrolytic plating, and on the Ni plating, Sn plating was formed, thereby obtaining the varistor 1 of Example 1.

In Comparative Example 1, a varistor was manufactured in a similar manner to Example 1 except that the insulating layer was not formed. In Comparative Example 2, a varistor was manufactured in a similar manner to Example 1 except that an external electrode paste containing no $Bi_2O_3$ was adopted.

<Evaluation>

[Humidity Load Test]

The varistors thus manufactured were subjected to a humidity load test under the following condition to evaluate the moisture resistance.

(Condition) Temperature: 85° C., Relative humidity: 85% RH, Load voltage: Varistor voltage V1 mA×85%, Test time: 2000 hours (Sample Form) Plated products were used. Note that in Comparative Example 1, a product after formation of the external electrodes was used due to plating flow.

(Moisture Resistance Valuation Characteristic)

Leakage current characteristic: Change rate (%) of a varistor voltage V1 μA before and after the humidity load test when a current of 1 μA was caused to flow. The leakage current characteristic shows the characteristic of the varistor which is in a state corresponding to a substantially off-state. A phenomenon occurs that the higher the change rate, the larger the leakage current at the time of actual use of the varistor.

Voltage non-linearity: Voltage ratio (V1 mA/V10 μA) of the varistor voltage V1 mA when a current 1 mA is caused to flow to a varistor voltage V10 μA when a current 10 μA is caused to flow, after the humidity load test. The voltage non-linearity is a general characteristic of the varistor and is a value representing non-linearity. If this value is large, it represents an unsatisfactory voltage non-linearity.

The external electrode (14) is electrically connected to the internal electrode (12), covers part of the sintered body (11) and part of the insulating layer (13), and is in contact with the part of the insulating layer (13). The insulating layer (13) has a region being in contact with the external electrode (14), the region having a greater average thickness than a region of the insulating layer (13) which is out of contact with the external electrode (14).

With the first aspect, the contact region thickness being greater than the non-contact region thickness presumably reduces moisture entering the sintered body (11) from a location of a contact region where the insulating layer (13) and the external electrode (14) weakly adhere to each other through the insulating layer (13) in a high humidity environment compared to the conventional varistor, and consequently, the varistor (1) is excellent in moisture resistance. Moreover, with the first aspect, the linear expansivity of the insulating layer (13) and the linear expansivity of the sintered body (11) are close to each other, and the crack resistance of the varistor (1) is thus improved, thereby further improving the moisture resistance.

In a second aspect of the present disclosure referring to the first aspect, the sintered body (11) includes ZnO.

With the second aspect, ZnO included in the sintered body (11) produces $Zn_2SiO_4$ by reaction with $SiO_2$ or the like, thereby easily forming the insulating layer (13).

In a third aspect of the present disclosure referring to the first or second aspect, the external electrode (14) includes $Bi_2O_3$.

TABLE 1

| | Whether or not insulating layer is formed | Whether or not external electrode includes $Bi_2O_3$ | Average thickness of insulating layer Non-contact area (area out of contact with external electrode) | Contact area (area in contact with external electrode) | Characteristic after humidity load test leakage current characteristic (change rate (%) of varistor voltage V 1 μA) | Voltage non-linearity (voltage ratio: V 1 μA/ V 10 μA |
|---|---|---|---|---|---|---|
| Example 1 | Formed | Included | 3 μm | 10 μm | −0.1 | 1.15 |
| Comparative Example 1 | Not Formed | Included | 0 μm | 3 μm | −62.2 | 1.84 |
| Comparative Example 2 | Formed | Not Included | 3 μm | 3 μm | −25.6 | 1.42 |

The results in Table 1 show that the varistor of Example 1 includes an insulating layer, has a greater contact region thickness than the non-contact region thickness, and is excellent in moisture resistance of the leakage current characteristic and the voltage non-linearity. In contrast, the varistor of Comparative Example 1 includes no $Zn_2SiO_4$ in the insulating layer, and the varistor of Comparative Example 2 has a contact region thickness and a non-contact region thickness equal to each other, and thus, the varistors of Comparative Example 1 and Comparative Example 2 are poor in moisture resistance.

As can be seen from the embodiment and examples described above, a varistor (1) of a first aspect of the present disclosure includes a sintered body (11), an internal electrode (12), an insulating layer (13), and an external electrode (14). The internal electrode (12) is disposed in an interior of the sintered body (11). The insulating layer (13) covers at least part of the sintered body (11) and includes $Zn_2SiO_4$.

With the third aspect, the external electrode (14) includes $Bi_2O_3$ whose effect of accelerating the formation of the insulating layer (13) by reaction between the semiconductor ceramic component included in the sintered body (11) and the glass component is presumably significant, and therefore, the formation of the insulating layer (13) is further accelerated and the contact region thickness is thus further increased in the region of the insulating layer (13) which is in contact with the external electrode (14), thereby further increasing the moisture resistance of the varistor (1).

In a fourth aspect of the present disclosure referring to the third aspect, the sintered body (11) substantially includes no $Bi_2O_3$, or a concentration of $Bi_2O_3$ in the sintered body (11) is lower than a concentration of $Bi_2O_3$ in the external electrode (14).

With the fourth aspect, the concentration of $Bi_2O_3$, whose effect of accelerating the formation of the insulating layer (13) by reaction between the semiconductor ceramic component included in the sintered body (11) and the glass component such as $SiO_2$ is presumably significant, in the sintered body (11) is set as explained above, and thereby, the contact region thickness of the insulating layer (13) becomes greater than the non-contact region thickness, which consequently improves the moisture resistance of the varistor (1).

In a fifth aspect of the present disclosure referring to any one of the first to fourth aspects, the external electrode is disposed at a side of the sintered body (11), and the fifth aspect includes a primary external electrode (15) in contact with a first region of the insulating layer (13) and a secondary external electrode (14) covering the primary external electrode (15) and being in contact with a second region of the insulating layer (13), the second region being different from the first region. An average thickness of the second region of the insulating layer (13) is greater than an average thickness of the first region of the insulating layer (13).

With the fifth aspect, the average thickness of the region of the insulating layer (13) which is in contact with the secondary external electrode (14) is further increased, thereby further improving the moisture resistance of the varistor (1).

In a sixth aspect of the present disclosure referring to the fifth aspect, the primary external electrode (15) includes substantially no $Bi_2O_3$, or a concentration of $Bi_2O_3$ in the primary external electrode (15) is lower than a concentration of $Bi_2O_3$ in the secondary external electrode (14).

With the sixth aspect, the concentration of $Bi_2O_3$, whose effect of accelerating the formation of the insulating layer (13) by reaction between the semiconductor ceramic component included in the sintered body (11) and the glass component such as $SiO_2$, in the primary external electrode (15) are set as explained above, and thereby, the contact region thickness (region in contact with the secondary external electrode (14)) of the insulating layer (13) is further increased, which consequently further improves the moisture resistance of the varistor (1).

A method for manufacturing a varistor according to a seventh aspect of the present disclosure includes preparing a sintered body (11) including ZnO as a main component and including an internal electrode (12) in an interior of the sintered body (11). The method further includes forming a precursor layer including $SiO_2$ or silicate such that the precursor layer covers at least part of the sintered body (11). The method further includes applying an external electrode paste including $Bi_2O_3$ such that the external electrode paste covers part of the sintered body (11) and is in contact with part of the precursor layer. The method further includes performing heat treatment to form an insulating layer (13) including $Zn_2SiO_4$ from the precursor layer and to form an external electrode (14) from the external electrode paste.

With the seventh aspect, reaction between ZnO included in the sintered body (11) and $SiO_2$ or silicate included in the precursor layer produces the insulating layer (13) including $Zn_2SiO_4$, and $Bi_2O_3$ included in the external electrode paste presumably has a significant effect of accelerating this formation reaction, and therefore, the contact region thickness becomes greater than the non-contact region thickness of the insulating layer (13), and thus, a varistor excellent in moisture resistance is easily manufactured.

In an eighth aspect of the present disclosure referring to the seventh aspect, the insulating layer (13) having a region being in contact with the external electrode (14) and having a greater average thickness than a region of the insulating layer (13) which is out of contact with the external electrode (14).

With the eighth aspect, the varistor is more excellent in moisture resistance.

In a ninth aspect of the present disclosure referring to the seventh or eighth aspect, the sintered body (11) includes substantially no $Bi_2O_3$, or a concentration of $Bi_2O_3$ in the sintered body (11) is lower than a concentration of $Bi_2O_3$ in the external electrode paste.

With the ninth aspect, the concentration of $Bi_2O_3$, whose effect of accelerating the formation of the insulating layer (13) including $Zn_2SiO_4$ by reaction between the semiconductor ceramic component included in the sintered body (11) and $SiO_2$ or silicate included in the precursor layer, in the sintered body (11) is set as explained above, and thereby, the contact region thickness of the insulating layer (13) becomes greater than the non-contact region thickness, which consequently further improves the moisture resistance of the varistor (1).

In a tenth aspect of the present disclosure referring to any one of the seventh or ninth aspect, a concentration of $Bi_2O_3$ in the external electrode paste is greater than or equal to 3% by mass and less than or equal to 30% by mass.

With the tenth aspect, the thickness of the region of the insulating layer (13) which is in contact with the secondary external electrode (14) is further increased, and consequently, the moisture resistance of the varistor is further improved.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A varistor comprising:

a sintered body;

an internal electrode disposed in an interior of the sintered body;

an insulating layer covering at least part of the sintered body and including $Zn_2SiO_4$; and an external electrode electrically connected to the internal electrode, covering part of the sintered body and part of the insulating layer, and being in contact with the part of the insulating layer, wherein:

the insulating layer includes a region in contact with the external electrode, and the region has a greater average thickness than a region of the insulating layer which is out of contact with the external electrode.

2. The varistor of claim 1, wherein the sintered body includes ZnO.

3. The varistor of claim 1, wherein the external electrode includes $Bi_2O_3$.

4. The varistor of claim 3, wherein the sintered body includes no $Bi_2O_3$, or a mass concentration of $Bi_2O_3$ in the sintered body is lower than a mass concentration of $Bi_2O_3$ in the external electrode.

5. The varistor of claim 1, wherein the external electrode includes a primary external electrode disposed at a side of the sintered body and being in contact with a first region of the insulating layer, and a secondary external electrode covering the primary external electrode and being in contact with a second region of the insulating layer, the second region being different from the first region, and an average thickness of the second region of the insulating layer is greater than an average thickness of the first region of the insulating layer.

6. The varistor of claim 5, wherein the primary external electrode includes no $Bi_2O_3$, or a mass concentration of $Bi_2O_3$ in the primary external electrode is lower than a mass concentration of $Bi_2O_3$ in the secondary external electrode.

7. A method for manufacturing a varistor, the method comprising:

preparing a sintered body including ZnO as a main component and including an internal electrode disposed in an interior of the sintered body;

forming a precursor layer including $SiO_2$ or silicate such that the precursor layer covers at least part of the sintered body;

applying an external electrode paste including $Bi_2O_3$ such that the external electrode paste covers part of the sintered body and is in contact with part of the precursor layer;

performing heat treatment to form an insulating layer including $Zn_2SiO_4$ from the precursor layer and to form an external electrode from the external electrode paste.

8. The method of claim 7, wherein the insulating layer having a region being in contact with the external electrode, the region having a greater average thickness than a region of the insulating layer which is out of contact with the external electrode.

9. The method of claim 7, wherein the sintered body includes substantially no $Bi_2O_3$, or a mass concentration of $Bi_2O_3$ in the sintered body is lower than a mass concentration of $Bi_2O_3$ in the external electrode paste.

10. The method of claim 7, wherein a concentration of $Bi_2O_3$ in the external electrode paste is greater than or equal to 3% by mass and less than or equal to 30% by mass.

11. The varistor of claim 1, wherein the sintered body on which the insulating layer is formed has a flat surface, the insulating layer has a thickness from the flat surface of the sintered body in a depth direction of the sintered body.

12. A varistor comprising:

a sintered body;

an internal electrode disposed in an interior of the sintered body;

an insulating layer covering at least part of the sintered body and including $Zn_2SiO_4$; and an external electrode electrically connected to the internal electrode, covering part of the sintered body and part of the insulating layer, and being in contact with the part of the insulating layer, wherein:

the sintered body on which the insulating layer is formed has a flat surface, and the insulating layer includes a region in contact with the external electrode, and the region has a greater average thickness from a surface of the insulating layer than a region of the insulating layer which is out of contact with the external electrode.

13. The varistor of claim 12, wherein the sintered body includes ZnO.

14. The varistor of claim 12, wherein the external electrode includes $Bi_2O_3$.

15. The varistor of claim 14, wherein the sintered body includes no $Bi_2O_3$, or a mass concentration of $Bi_2O_3$in the sintered body is lower than a mass concentration of $Bi_2O_3$ in the external electrode.

16. The varistor of claim 12, wherein the external electrode includes a primary external electrode disposed at a side of the sintered body and being in contact with a first region of the insulating layer, and a secondary external electrode covering the primary external electrode and being in contact with a second region of the insulating layer, the second region being different from the first region, and an average thickness of the second region of the insulating layer is greater than an average thickness of the first region of the insulating layer.

17. The varistor of claim 16, wherein the primary external electrode includes no $Bi_2O_3$, or a mass concentration of $Bi_2O_3$ in the primary external electrode is lower than a mass concentration of $Bi_2O_3$ in the secondary external electrode.

* * * * *